(12) United States Patent
Kim

(10) Patent No.: US 9,139,105 B2
(45) Date of Patent: Sep. 22, 2015

(54) DECELERATION CONTROL METHOD AND SYSTEM FOR ELECTRIC VEHICLE WHILE COASTING

(71) Applicants: Hyundai Motor Company, Seoul (KR); Kia Motors Corporation, Seoul (KR)

(72) Inventor: Choong Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 133 days.

(21) Appl. No.: 14/091,229

(22) Filed: Nov. 26, 2013

(65) Prior Publication Data
US 2014/0172211 A1   Jun. 19, 2014

(30) Foreign Application Priority Data
Dec. 18, 2012 (KR) .................. 10-2012-0148812

(51) Int. Cl.
*B60L 15/20* (2006.01)
*B60W 10/02* (2006.01)

(52) U.S. Cl.
CPC .......... *B60L 15/2009* (2013.01); *Y02T 10/7005* (2013.01); *Y02T 10/7275* (2013.01)

(58) Field of Classification Search
CPC ... B60L 15/20; B60L 15/2009; Y02T 10/705; Y02T 10/725; B60W 20/40; B60W 10/02
USPC .......... 701/22, 90, 91, 93; 180/65.265
See application file for complete search history.

(56) References Cited

U.S. PATENT DOCUMENTS

2013/0162009 A1* 6/2013 Mitts et al. .................. 303/3
2014/0172211 A1* 6/2014 Kim ........................... 701/22

FOREIGN PATENT DOCUMENTS

| JP | 4363379 B2 | 11/2009 |
| KR | 10-0513522 B1 | 9/2005 |
| KR | 10-0986321 B1 | 10/2010 |

* cited by examiner

*Primary Examiner* — Tan Q Nguyen
(74) *Attorney, Agent, or Firm* — McDermott Will & Emery LLP

(57) ABSTRACT

A deceleration control method and system for an electric vehicle that performs deceleration by hydraulic pressure braking when a battery of the electric vehicle is in a fully charged state while coasting. The deceleration control method for an electric vehicle includes determining whether the electric vehicle is coasting, comparing a coasting speed with a predetermined creep speed when the electric vehicle is coasting, calculating an amount of regenerative power generation corresponding to the coasting speed when the coasting speed is higher than the predetermined creep speed, comparing the calculated regenerative power generation amount with a chargeable power amount of the battery, and generating predetermined hydraulic pressure braking torque when the calculated regenerative power generation amount is higher than the chargeable power amount of the battery.

12 Claims, 7 Drawing Sheets

DECELERATION CONTROL METHOD AND SYSTEM FOR ELECTRIC VEHICLE WHILE COASTING

CROSS-REFERENCE TO RELATED APPLICATION

This application is based on and claims the benefit of priority to Korean Patent Application No. 10-2012-0148812 filed in the Korean Intellectual Property Office on Dec. 18, 2012, the entire contents of which are incorporated herein by reference.

TECHNICAL FIELD

The present disclosure relates to a deceleration control method and system for an electric vehicle while coasting, and more particularly, to a deceleration control method and system for an electric vehicle decelerating by hydraulic pressure braking when a battery of the electric vehicle is in a fully charged state while coasting.

BACKGROUND

An electric vehicle is a vehicle running by a battery power. There are several types such as a pure electric vehicle running only by electric power of a battery and a hybrid electric vehicle running by power of an internal combustion engine and electric power of a battery.

The pure electric vehicle runs only by power of a motor operating by electric power of a battery. The hybrid electric vehicle runs by efficiently combining power of the internal combustion engine and power of the motor.

For example, as illustrated in FIG. 1, a hybrid electric vehicle includes: an engine 10; a motor 20; an engine clutch 30 which controls power transmission between the engine 10 and the motor 20; a transmission 40; a differential gear 50; a battery 60; an integrated starter-generator (ISG) 70 which starts the engine 10 or generates electric power by output of the engine 10; and wheels 80.

The hybrid electric vehicle further includes: a hybrid control unit (HCU) 200 for controlling an overall operation of the hybrid electric vehicle; an engine control unit (ECU) 110 for controlling an operation of the engine 10; a motor control unit (MCU) 120 for controlling an operation of the motor 20; a transmission control unit (TCU) 140 for controlling an operation of the transmission 40; and a battery control unit (BCU) 160 for managing and controlling the battery 60.

The BCU 160 may also be referred to as a battery management system (BMS), and the ISG 70 may also be referred to as a starting/generating motor or a hybrid starter-generator (HSG).

The hybrid electric vehicle may be driven in an electric vehicle (EV) mode which is a mode of a true electric vehicle solely using power of the motor 20, a hybrid electric vehicle (HEV) mode using torque of the motor 20 as an auxiliary power while using torque of the engine 10 as a main power; and a regenerative braking (RB) mode collecting braking and inertia energy through power generation of the motor 20 to charge the battery 60 during braking or driving using the inertia of the vehicle.

The motor 20 of the hybrid electric vehicle and a motor of the pure electric vehicle generally operate as a generator for collecting inertial energy during the regenerative braking (RB) mode. The running by inertial energy of an electric vehicle such as the hybrid electric vehicle and the pure electric vehicle may refer to as coasting. When the motor operates as a generator for collecting the inertial energy, braking of the electric vehicle also occurs.

As shown in FIG. 2, by setting a negative (minus) torque to the motor while coasting, the inertia energy may be collected as a regenerative electric power, and braking of the electric vehicle may also occur.

When the motor operates as a generator, the regenerative electric power generally charges a battery and/or a high voltage battery to drive the motor of the electric vehicle.

However, when the battery is in a fully charged state such that charging is limited or in an over-temperature state, the regenerative electric power from the motor 20 cannot charge the battery. In that case, because the regenerative braking also occurring with regenerative power generation by the motor 20 cannot be performed, the electric vehicle may collide with a foregoing vehicle.

When the battery is in the fully charged state while coasting, an electric vehicle according to an exemplary embodiment of the related art performs a fuel-cut control instead of the regenerative braking and uses friction torque (negative torque) of the engine, as shown in FIG. 3.

In another exemplary embodiment of the related art, when the battery is in the fully charged state while coasting, the regenerative electric power of the motor produced by the regenerative braking is consumed by an air conditioner or a heater 90 as shown in FIG. 4.

However, according to the exemplary embodiments of the related art as described above, temperature in the electric vehicle may be varied due to the unwanted operation of the air conditioner or heater, and drivability may rapidly deteriorate due to the fuel-cut.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a deceleration control method and system for an electric vehicle while coasting having advantages of performing deceleration by hydraulic pressure braking when a battery of the electric vehicle is in a fully charged state.

An exemplary embodiment of the present inventive concept provides a deceleration control method for an electric vehicle that includes a motor operated by a battery power while coasting, including: determining whether the electric vehicle is coasting; comparing a coasting speed with a predetermined creep speed when the electric vehicle is coasting; calculating an amount of regenerative power generation corresponding to the coasting speed when the coasting speed is higher than the predetermined creep speed; comparing the calculated regenerative power generation amount with a chargeable power amount of the battery; and generating a predetermined hydraulic pressure braking torque when the calculated regenerative power generation amount is higher than the chargeable power amount of the battery.

The electric vehicle's coasting is determined based on signals outputted from an accelerator pedal position sensor (APS) and a brake pedal position sensor (BPS) when an accelerator pedal and a brake pedal are not manipulated (when a driver does not step on either an accelerator pedal or a brake pedal).

The chargeable power amount of the battery is confirmed through a battery management system (BMS) of the electric vehicle.

The predetermined creep speed is established based on a moving speed of the electric vehicle while the accelerator pedal and the brake pedal are not manipulated (when a driver does not step on either an accelerator pedal or a brake pedal).

The predetermined hydraulic pressure braking torque is established based on a value determined by subtracting the chargeable power amount of the battery from the calculated regenerative power generation amount.

The electric vehicle is a hybrid electric vehicle.

Another aspect of an embodiment of the present inventive concept provides a deceleration control system for an electric vehicle having a motor operated by battery power while coasting, including: an accelerator pedal position sensor (APS) to detect a position of an accelerator pedal; a brake position sensor (BPS) to detect a position of a brake pedal; a vehicle speed sensor to detect speed of a vehicle; a motor control unit (MCU) configured to control operation of the motor; a battery control unit (BCU) configured to manage and control an SOC (state of charge) of the battery; a brake control unit configured to control a hydraulic pressure brake actuator of the electric vehicle; and a deceleration control unit configured to determine whether the electric vehicle is coasting based on the signals of the respective sensors and to perform a deceleration control by regenerative braking and hydraulic pressure braking based on the vehicle speed and the SOC of the battery, wherein the deceleration control unit is operated by a predetermined program, and the predetermined program includes a series of commands for executing a deceleration control method for an electric vehicle having a motor operated by a battery power while coasting, including: determining whether the electric vehicle is coasting; comparing a coasting speed with a predetermined creep speed when the electric vehicle is coasting; calculating an amount of regenerative power generation corresponding to the coasting speed when the coasting speed is higher than the predetermined creep speed; comparing the calculated regenerative power generation amount with a chargeable power amount of the battery; and generating a predetermined hydraulic pressure braking torque when the calculated regenerative power generation amount is higher than the chargeable power amount of the battery.

As described above, according to an embodiment of the present inventive concept, it is possible to perform deceleration by hydraulic pressure braking when the battery of the electric vehicle is in a fully charged state while coasting.

DETAILED DESCRIPTION OF THE EMBODIMENTS

Figure 1:
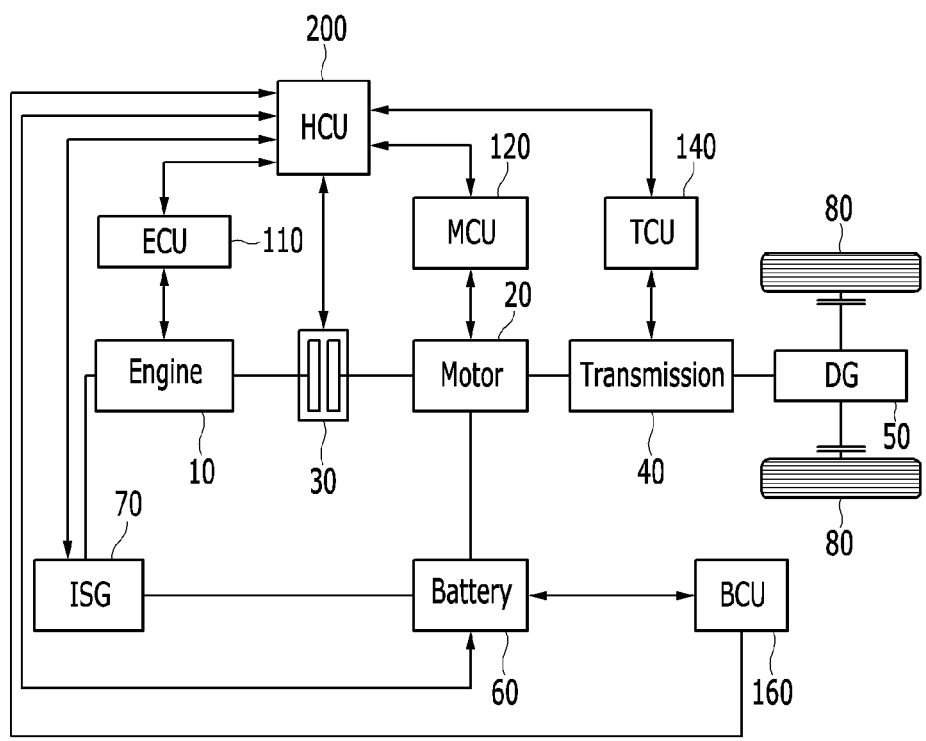
FIG. 1 is an exemplary block diagram illustrating a configuration of a typical hybrid electric vehicle.
Figure 2:
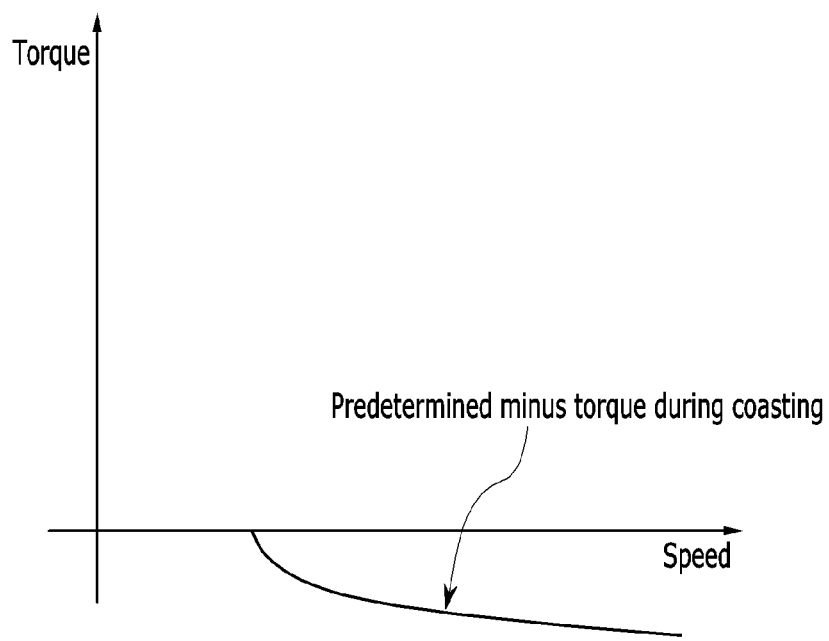
FIG. 2 is an exemplary graph illustrating a negative (minus) torque of a motor corresponding to coasting torque of a hybrid electric vehicle.
Figure 3:
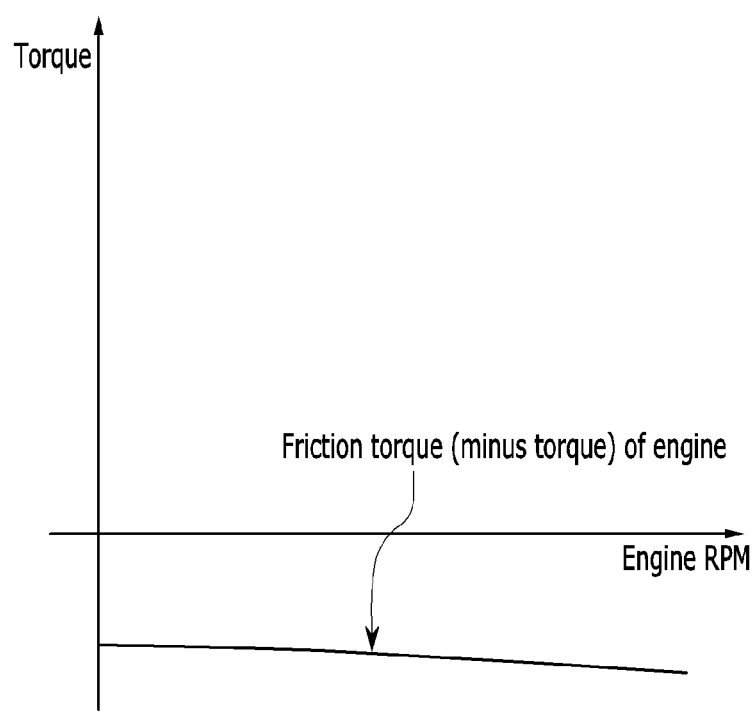
FIG. 3 is an exemplary graph illustrating negative (minus) torque of an engine corresponding to coasting torque of a hybrid electric vehicle.
Figure 4:
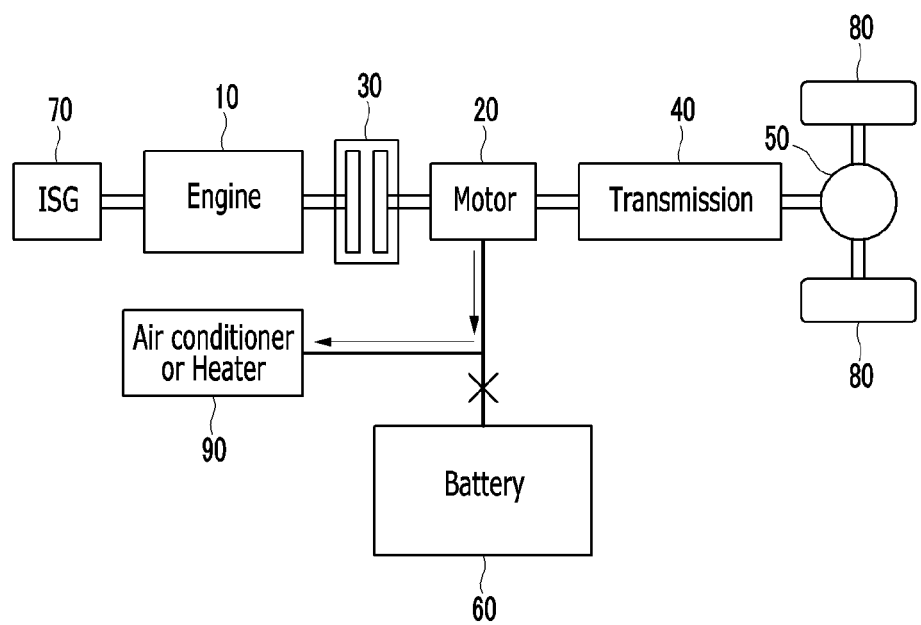
FIG. 4 is an exemplary configuration diagram of a deceleration control system for an electric vehicle while coasting according to an exemplary embodiment of the related art.

Hereinafter, the present disclosure will be described more fully with reference to the accompanying drawings, in which exemplary embodiments of the inventive concept are shown. As those skilled in the art would realize, the described embodiments may be modified in various different ways, all without departing from the spirit or scope of the present disclosure.

Further, throughout the specification, like reference numerals refer to like elements.

FIG. 1 is an exemplary diagram illustrating a typical hybrid electric vehicle that is one electric vehicle to which a deceleration control system may be applied while coasting according to an exemplary embodiment of the present inventive concept.

As shown in FIG. 1, a hybrid electric vehicle to which a deceleration control system while coasting according to an exemplary embodiment of the present inventive concept can be applied generally includes an engine 10, a motor 20, an engine clutch 30, a transmission 40, a differential gear 50, a battery 60, and an integrated starter-generator 70. The engine clutch 30 controls power transmission between the engine 10 and the motor 20, and the integrated starter-generator 70 starts the engine 10 or generates electric power by output of the engine 10.

The hybrid electric vehicle to which the deceleration control system can be applied while coasting according to the exemplary embodiment of the present inventive concept further includes a hybrid control unit (HCU) 200 configured to control an overall operation of the hybrid electric vehicle, an engine control unit (ECU) 110 configured to control an operation of the engine 10, a motor control unit (MCU) 120 configured to control an operation of the motor 20, a transmission control unit (TCU) 140 configured to control an operation of the transmission 40, and a battery control unit (BCU) 160 configured to manage and control the battery 60.

Figure 5:
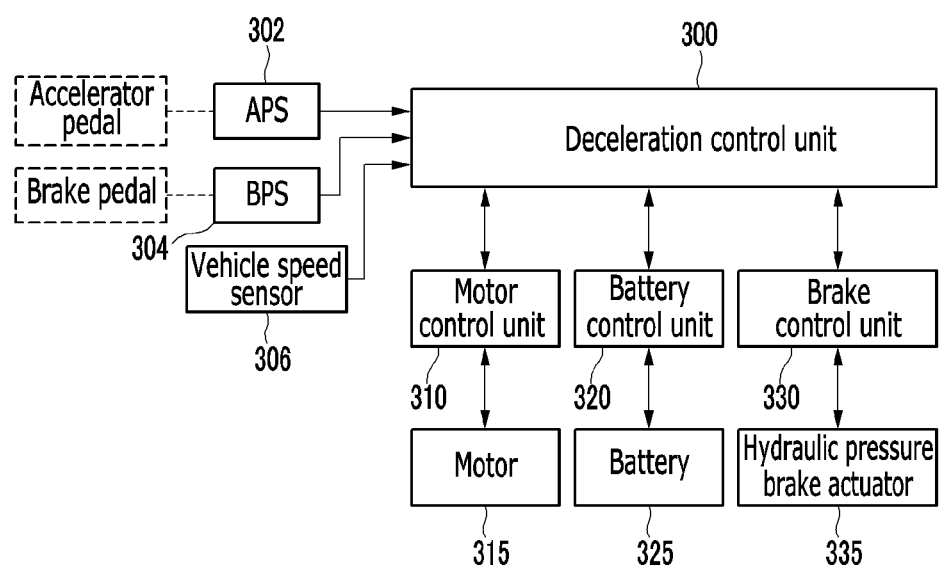
FIG. 5 is an exemplary configuration diagram of a deceleration control system for an electric vehicle while coasting according to an exemplary embodiment of the present inventive concept.

FIG. 5 is an exemplary configuration diagram of a deceleration control system for an electric vehicle while coasting according to an exemplary embodiment of the present inventive concept.

The deceleration control system for an electric vehicle while coasting according to an exemplary embodiment of the present inventive concept is a system that performs deceleration by hydraulic pressure braking when a battery of the electric vehicle is in a fully charged state while coasting.

The deceleration control system for an electric vehicle while coasting according to an exemplary embodiment of the present inventive concept may include: an accelerator pedal position sensor (APS) 302 to detect a position of an accelerator pedal; a brake position sensor (BPS) 304 to detect a position of a brake pedal; a vehicle speed sensor 306 to detect speed of an electric vehicle; a motor control unit (MCU) 310 configured to control operation of a motor 315; a battery control unit (BCU) 320 configured to manage and control an SOC (state of charge) of a battery 325; a brake control unit 330 configured to control a hydraulic pressure brake actuator 335 of the electric vehicle; and a deceleration control unit 300 configured to determine whether the electric vehicle is coasting based on signals of respective sensors and to perform deceleration control by regenerative braking and hydraulic pressure braking based on the vehicle speed and the SOC of the battery 325 while coasting.

The motor control unit 310 and the battery control unit 320 may respectively correspond to the motor control unit 120 and the battery control unit 160 illustrated in FIG. 1. Further, the motor 315 and battery 325 may respectively correspond to the motor 20 and battery 60 illustrated in FIG. 1.

In the exemplary embodiment of the present inventive concept, the APS 302 may be a sensor interlocked with an accelerator pedal to detect a position of the accelerator pedal, but the scope of the present inventive concept is not essentially limited thereto. Other configurations capable of substantially detecting a signal corresponding to a position of the accelerator pedal may be used in the exemplary embodiment of the present inventive concept in the same way as the APS 302.

The APS 302 detects a signal corresponding to a position of the accelerator pedal and inputs the detected signal to the deceleration control unit 300.

In the exemplary embodiment of the present inventive concept, for example, the BPS 304 may be a sensor interlocked with a brake pedal to detect a position of the brake pedal, but the scope of the present inventive concept is not necessarily limited thereto. Other configurations capable of substantially detecting a signal corresponding to a position of the brake pedal may be used in the exemplary embodiment of the present inventive concept in the same way as the BPS 304.

The BPS 304 detects a signal corresponding to a position of the brake pedal, and inputs the detected signal to the deceleration control unit 300.

In the exemplary embodiment of the present inventive concept, the vehicle speed sensor 306 is in the form of a sensor attached to one or more wheels of the electric vehicle and is configured to detect revolutions per minute. According to another exemplary embodiment of the present inventive concept, the vehicle speed sensor 306 is attached to a final reduction gear of a transmission. However, the configuration of the vehicle speed sensor 306 can vary, and thus is not limited to these examples. Rather, the present inventive concept could include a variety of vehicle speed sensor 306 configurations capable of calculating a value corresponding to an actual electric vehicle speed.

The vehicle speed sensor 306 detects a speed of the electric vehicle and inputs the speed of the electric vehicle to the deceleration control unit 300.

The motor control unit 310 may control the motor 315 by itself or may control the motor 315 according to a signal from the deceleration control unit 300.

The motor control unit 310 may control the motor 315 so that the motor 315 may regenerate electric power according to a torque command signal for a regenerative power generation from the deceleration control unit 300 while coasting.

The battery control unit 320 manages and controls an SOC (state of charge) of the battery 325. The deceleration control unit 300 may be connected to the battery control unit 320 in order to confirm the SOC of the battery 325.

The brake control unit 330 may, by itself, control the hydraulic pressure brake actuator 335 or may control the hydraulic pressure brake actuator 335 according to a signal from the deceleration control unit 300. The hydraulic pressure brake actuator 335 is operated by hydraulic pressure.

The brake control unit 330 may be connected to the deceleration control unit 300 in order to control the hydraulic pressure brake actuator 335 according to a torque command signal for hydraulic braking.

The brake control unit 330 and the hydraulic pressure brake actuator 335 may respectively correspond to a typical brake control unit and a hydraulic pressure brake actuator known to a person of ordinary skill in the art.

The deceleration control unit 300 includes one or more processors or microprocessors and/or hardware operated by a predetermined program including a series of commands for executing a deceleration control method according to an exemplary embodiment of the present inventive concept to be described below.

According to an exemplary embodiment, the deceleration control unit 300 may include the motor control unit 310, the battery control unit 320, and the brake control unit 330. According to another exemplary embodiment, the deceleration control unit 300 may be included in the motor control unit 310 or the brake control unit 330.

In a deceleration control method according to an exemplary embodiment of the present inventive concept which will be described below, some processes may be performed by the deceleration control unit 300, and other processes may be performed by the motor control unit 310, the battery control unit 320, or the brake control unit 330.

However, the scope of the present disclosure is not limited to the exemplary embodiment to be described below. The deceleration control unit 300 and other units may be implemented with a different combination from that described in the exemplary embodiment of the present inventive concept. Otherwise, the deceleration control unit 300, the motor control unit 310, the battery control unit 320, and the brake control unit 330 may perform a different combination of processes from those described in the exemplary embodiment of the present inventive concept.

Hereinafter, a deceleration control method for an electric vehicle while coasting according to an exemplary embodiment of the present inventive concept will be described with reference to the accompanying drawings.

Figure 6:
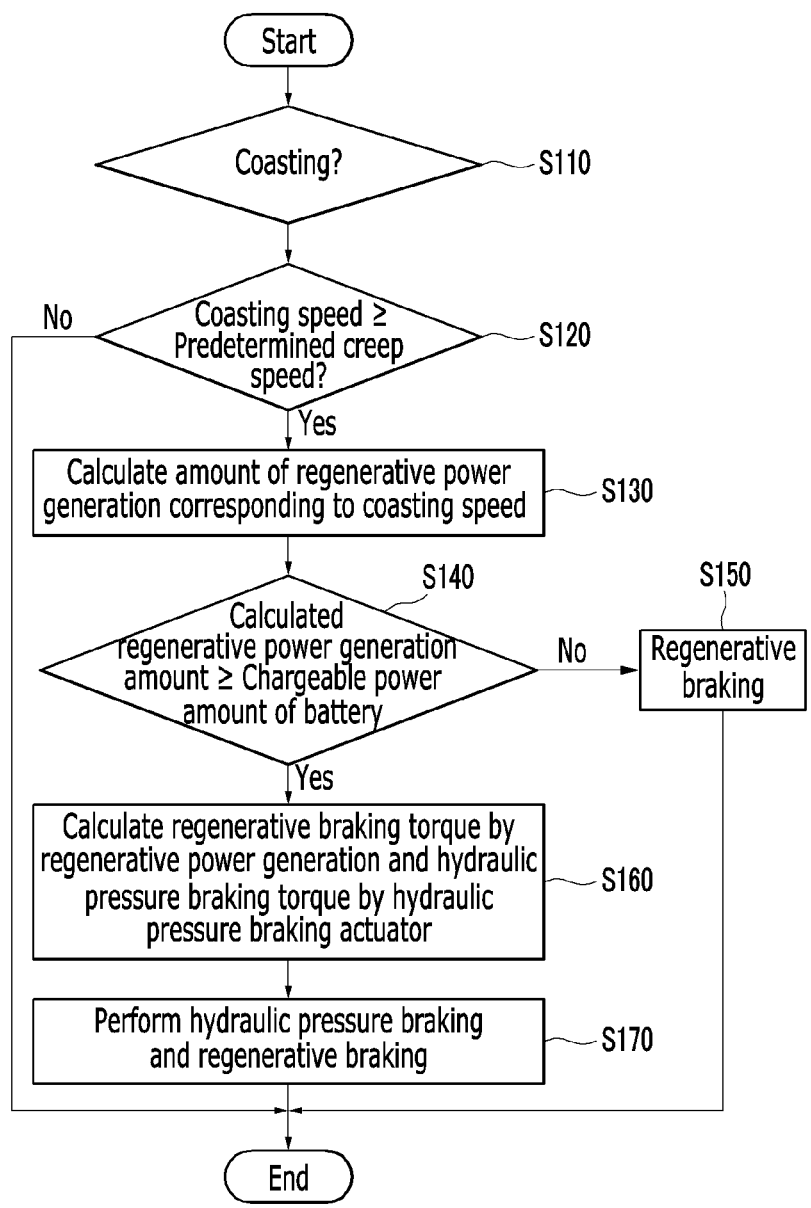
FIG. 6 is an exemplary flowchart of a deceleration control method for an electric vehicle while coasting according to an exemplary embodiment of the present inventive concept.
Figure 7:
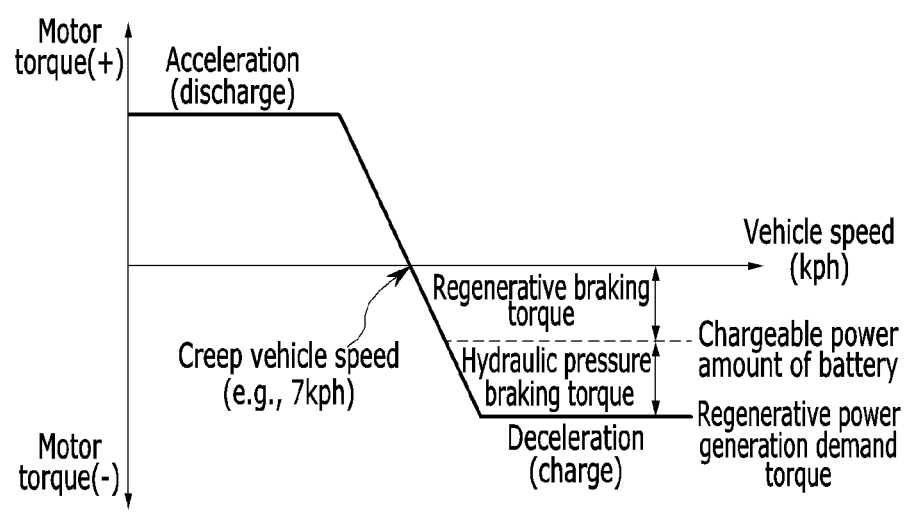
FIG. 7 is an exemplary graph for explaining operation of exemplary embodiments of the present inventive concept.

FIG. 6 is an exemplary flowchart of a deceleration control method for an electric vehicle while coasting according to an exemplary embodiment of the present inventive concept.

The deceleration control unit 300 determines whether the electric vehicle is coasting based on signals from the APS 302 and the BPS 304 at step S110 in FIG. 6.

For example, when the APS 302 and the BPS 304 output signals corresponding to a case in which the accelerator pedal and the brake pedal are not manipulated (when a driver does not step on either the accelerator pedal or the brake pedal), the deceleration control unit 300 determines that the electric vehicle is coasting.

While the electric vehicle is coasting, the deceleration control unit 300 determines whether the coasting speed is higher than a predetermined creep speed (e.g., 7 kph) at step 120.

A creep speed designates a moving speed of the electric vehicle when the accelerator pedal and the brake pedal are not manipulated. The coasting speed may be detected by the vehicle speed sensor 306.

When the coasting speed is higher than the predetermined creep speed, the deceleration control unit 300 calculates an amount of regenerative power generation corresponding to the coasting speed, by itself or through the motor control unit 310, at step 130.

Further, when the coasting speed is under the predetermined creep speed, the deceleration control unit 300 may control the motor 315 through the motor control unit 310 to maintain the predetermined creep speed.

When the amount of regenerative power generation corresponding to the coasting speed is calculated, the deceleration control unit 300 compares the calculated regenerative power generation amount with a chargeable power amount of the battery 325 at step 140.

The chargeable power amount of the battery 325 may be confirmed through the SOC of the battery 325, which is well known to a person of ordinary skill in the art.

For example, the deceleration control unit 300 may confirm the SOC of the battery 325 through the motor control unit 320 and confirms the chargeable power amount of the battery 325 based on the confirmed SOC of the battery 325.

When the calculated regenerative power generation amount is under the chargeable power amount of the battery, the deceleration control unit 300 transmits a torque command signal for the regenerative power generation to the motor control unit 310 so that the motor control unit 310 may drive and control the motor 315 in a regenerative power generation mode (or a regenerative braking mode) at step 150.

When the motor control unit 310 drives and controls the motor 315 in the regenerative power generation mode, the motor 315 outputs the regenerative power decelerating the electric vehicle, and the battery 325 may be charged with the regenerative power outputted from the motor 315, which is well known to a person of ordinary skill in the art.

When the calculated regenerative power generation amount is higher than the chargeable power amount of the battery, the deceleration control unit 300 subtracts the chargeable power amount of the battery 325 from the calculated regenerative power generation amount, and calculates a regenerative braking torque through the regenerative power generation of the motor 315 and a hydraulic pressure braking torque by operation of the hydraulic pressure brake actuator 335 at step S160 as illustrated in FIG. 6.

When the regenerative braking torque and the hydraulic pressure braking torque are calculated, the deceleration control unit 300 transmits respective commands for the regenerative braking torque and the hydraulic pressure braking torque to the motor control unit 310 and the brake control unit 330, and then the motor control unit 310 and the brake control unit 330 perform regenerative braking and hydraulic pressure braking, respectively, at step 170.

When the command for the regenerative braking torque is transmitted from the deceleration control unit 300, the motor control unit 310 drives and controls the motor 315 in a regenerative power generation mode according to the command for the regenerative braking torque to perform the regenerative braking.

Also, when the command for the hydraulic pressure braking torque is transmitted from the deceleration control unit 300, the brake control unit 330 operates the hydraulic pressure brake actuator 335 according to the command for the regenerative braking torque to perform the hydraulic pressure braking.

According to an embodiment of the present inventive concept, deceleration cannot be performed by hydraulic pressure braking and/or regenerative power generation when a battery of the electric vehicle is in the fully charged state while coasting.

While the present disclosure has been described in connection with what is presently considered to be practical exemplary embodiments, the inventive concept is not limited to the disclosed embodiments, but is intended to cover various modifications and equivalent arrangements included within the spirit and scope of the appended claims.

What is claimed is:

1. A deceleration control method for an electric vehicle that includes a motor operated by a battery power while coasting, the method comprising:
    determining whether the electric vehicle is coasting;
    comparing a coasting speed with a predetermined creep speed when the electric vehicle is coasting;
    calculating an amount of regenerative power generation corresponding to the coasting speed when the coasting speed is higher than the predetermined creep speed;
    comparing the calculated regenerative power generation amount with a chargeable power amount of the battery; and
    generating a predetermined hydraulic pressure braking torque when the calculated regenerative power generation amount is higher than the chargeable power amount of the battery.

2. The deceleration control method of claim 1, wherein the step of determining whether the electric vehicle is coasting includes determining, based on signals outputted from an accelerator pedal position sensor (APS); and a brake pedal position sensor (BPS), when an accelerator pedal and a brake pedal are not manipulated.

3. The deceleration control method of claim 1, wherein the chargeable power amount of the battery is confirmed through a battery management system (BMS) of the electric vehicle.

4. The deceleration control method of claim 2, wherein the predetermined creep speed is established based on a moving speed of the electric vehicle while the accelerator pedal and the brake pedal are not manipulated.

5. The deceleration control method of claim 1, wherein the predetermined hydraulic pressure braking torque is established based on a value determined by subtracting the chargeable power amount of the battery from the calculated regenerative power generation amount.

6. The deceleration control method of claim 1, wherein the electric vehicle is a hybrid electric vehicle.

7. A deceleration control system for an electric vehicle that includes a motor operated by a battery power while coasting, comprising:
    an accelerator pedal position sensor (APS) configured to detect a position of an accelerator pedal;
    a brake position sensor (BPS) configured to detect a position of a brake pedal;
    a vehicle speed sensor configured to detect a speed of a vehicle;
    a motor control unit (MCU) configured to control operation of the motor;
    a battery control unit (BCU) configured to manage and control an state of charge (SOC) of the battery;
    a brake control unit configured to control hydraulic pressure braking of the electric vehicle; and
    a deceleration control unit configured to determine whether the electric vehicle is coasting based on signals of the respective sensors and to perform deceleration control by regenerative braking and hydraulic pressure braking based on the vehicle speed and the SOC of the battery while coasting,
    wherein the deceleration control unit is operated by a predetermined program which includes a series of commands for executing functions to control deceleration of an electric vehicle having a motor operated by a battery power while coasting, the functions comprising:
    determining whether the electric vehicle is coasting;
    comparing a coasting speed with a predetermined creep speed when the electric vehicle is coasting;
    calculating an amount of regenerative power generation corresponding to the coasting speed when the coasting speed is higher than the predetermined creep speed;
    comparing the calculated regenerative power generation amount with a chargeable power amount of the battery; and generating a predetermined hydraulic pressure braking torque when the calculated regenerative power generation amount is higher than the chargeable power amount of the battery.

8. The deceleration control system of claim 7, wherein the determining whether the electric vehicle is coasting includes the determining, based on signals outputted from an accelerator pedal position sensor (APS) and a brake pedal position sensor (BPS), when an accelerator pedal and a brake pedal are not manipulated.

9. The deceleration control system of claim 7, wherein the chargeable power amount of the battery is confirmed through a battery management system (BMS) or the BCU of the electric vehicle.

10. The deceleration control system of claim 8, wherein the predetermined creep speed is set based on moving speed of the electric vehicle while the accelerator pedal and the brake pedal are not manipulated.

11. The deceleration control system of claim 7, wherein the predetermined hydraulic pressure braking torque is set based on a value that is determined by subtracting the chargeable power amount of the battery from the calculated regenerative power generation amount.

12. The deceleration control system of claim 7, wherein the electric vehicle is a hybrid electric vehicle.

* * * * *